Oct. 17, 1950     P. C. REBUT     2,526,414
VIBRATOR DEVICE

Filed July 19, 1948     3 Sheets-Sheet 1

INVENTOR
PIERRE C. REBUT
BY Young, Emery & Thompson
ATT'S.

Oct. 17, 1950     P. C. REBUT     2,526,414
VIBRATOR DEVICE

Filed July 19, 1948     3 Sheets-Sheet 2

INVENTOR
PIERRE C. REBUT
By Young, Emery & Thompson
Attys.

Patented Oct. 17, 1950

2,526,414

UNITED STATES PATENT OFFICE 2,526,414

VIBRATOR DEVICE

Pierre Charles Rebut, Paris, France

Application July 19, 1948, Serial No. 39,545
In France August 5, 1947

7 Claims. (Cl. 74—87)

My present invention relates to improvements in vibrators and more particularly vibrators adapted to produce high frequency vibrations.

It is known that in conventional vibrators the production of vibrations is obtained through rotation of an eccentric mass. In practice, for that purpose, unbalanced masses supported on pins mounted for rolling movement in ball or roller bearings are used, or a rotatable cylindrical mass is arranged for rotation within a cylindrical housing, said mass being in eccentric relationship with respect to said housing.

The last-mentioned arrangement has the advantage of being well adapted to produce high-frequency vibrations as a result of the epicyclic movement imparted to the rotary mass.

However, in apparatus of the above-mentioned type great difficulty has been encountered by designers to produce apparatus having a high power output. Due to secondary or side stresses generated by the movement of the bodies rotating at high speeds, breaks frequently occur in the elements of the device.

It is an object of this invention to overcome those drawbacks. The invention makes it possible to avoid the production of secondary stresses and the attendant break-down of the parts in motion. It thus makes possible the construction of vibrators wherein the frequency of vibration may reach values as high as several hundred thousand vibrations per minute, and which are adapted to develop a centrifugal force in the order of tens or hundreds of tons.

Broadly stated, the invention as applied to vibrators of the above-described type including a body of revolution eccentrically arranged for rotation in and with respect to a recess formed as a volume of revolution, consists of controlling the rotary body from a device attached at points externally related to the rolling circumference and provided with a certain amount of freedom between the driving member and the rotary body. This connection between the driving member and the rotary mass is accomplished in a non-rigid or yielding manner through oscillatable or flexible links arranged on both sides of an intermediate plane of rotation and symmetrically with respect to said plane.

Since the connection for the control member driving the rotary mass is effected at points external to the rolling circumference, the point of connection in its epicyclic movement describes a curve which will only present small oscillations without any loops or cusps. Said point of connection is connected with a point of the drive member which describes a circumference. The amount of freedom provided between the drive member and the point of connection therewith makes it possible to allow for relative deviations between the paths of travel of both said points. The oscillations of the point of connection of the rotary mass are effected freely and without giving rise to harmful side stresses. In this way, the strength requirements for withstanding such stresses, which form a limitation in the construction of conventional apparatus, will no longer be restrictive as concerns the obtaining of high frequencies which will thus be easily capable of reaching several hundreds of thousands vibrations per minute.

The accompanying drawings illustrate by way of example one form of embodiment of a vibrator according to this invention.

Figure 1:
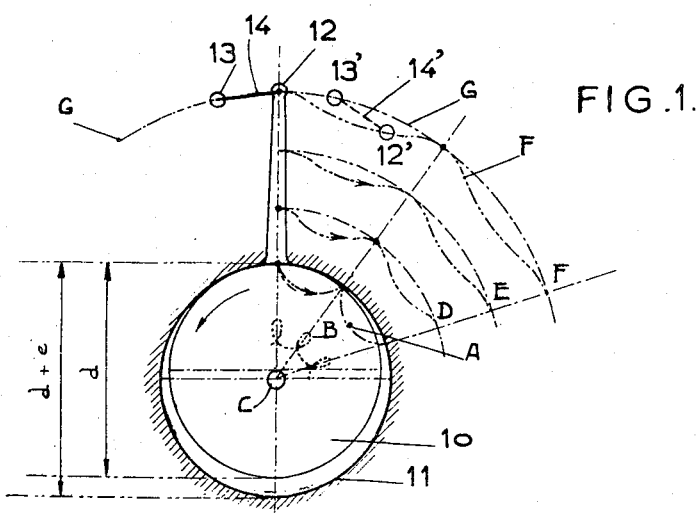
Figure 1 is a diagrammatic illustration of the drive for the eccentric rotary mass which clearly shows the principle used in producing said drive.
Figure 3:
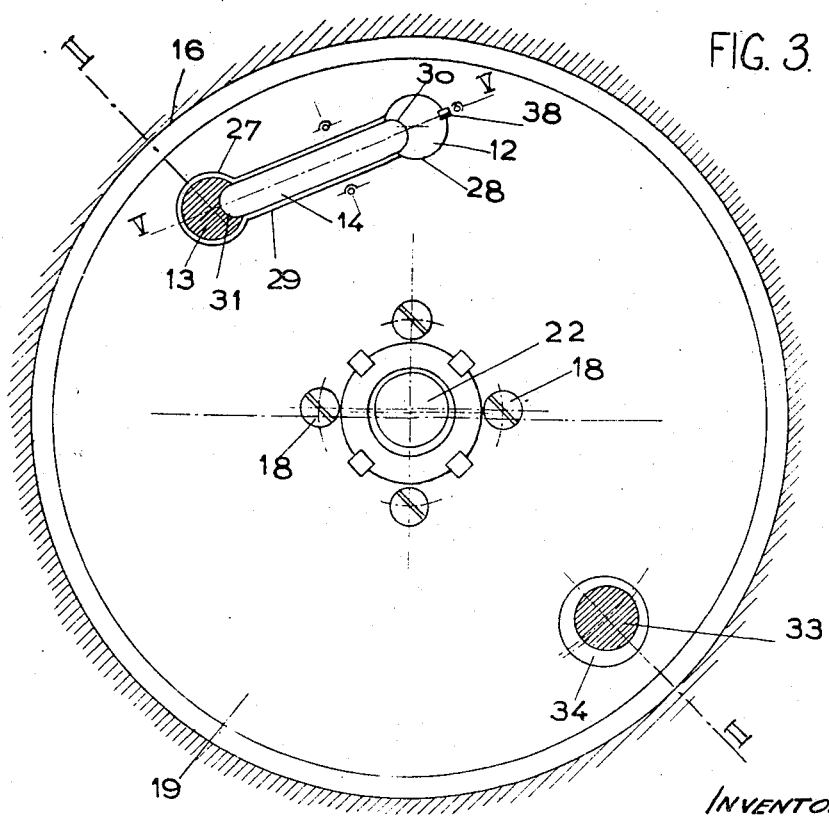
Figure 3 is a section on the line III—III of Fig. 2.

As shown, my improved vibrator essentially comprises a cylindrical mass or body 10 having a diameter $d$ adapted to roll within a fixed cylindrical recess 11 having a diameter $d+e$, with the mass 10 being eccentrically arranged with respect to the recess 11.

It is known that as the mass 10 is rotated in the direction indicated by the arrow, any given point thereof will describe with respect to the housing recess an epicycloid. The epicycloids relating to the different points of the mass will vary in shape according to the particular point selected, and a few characteristic shapes are indicated in dot-dash lines in Figure 1. For the points of the circumference of contact between the mass 10 and the recess 11, the related epicycloids are curves such as A having cusps. For points inside said contact circumference, the related epicycloids are curves such as B having a plurality of loops. The center C of the mass 10 describes a circumference of a radius corresponding with the degree of eccentricity between the circumferences 10 and 11; the rate at which said center will describe this circumference is the higher as the difference $e$ between the diameters of the circumferences 10 and 11 is smaller.

Points outside the contact circumference of 10 also follow epicycloids without any cusps or loops, but having a sequence of undulations, such as shown at D, E, F, the centers of curvature of the paths of travel being the contact points between the circumferences 10 and 11. The amplitude of said oscillations is always equal to twice the degree of eccentricity between 10 and 11, that is it is equal to $e$. But, the greater the spacing from the point under consideration to the contact circumference of 10, the greater will be the radius of curvature, and the lower, consequently, will be the accelerations of the point along its path of travel, especially for those points located along the extension of the radius corresponding to the point of contact.

According to the invention, the eccentric rotary mass 10 is driven in rotation through a point 12 as far as possible away from its contact circumference with the recess 11, and that point 12 is connected as at 13 with the rotary drive member, centered on the center of the recess 11, a certain amount of freedom being provided in the connection 14 between 12 and 13.

In this way, the point 13 which is centered concentrically with the recess 11 describes a fixed circumference G, while the point of connection 12 follows the epicycloid F. Because of the freedom allowed in the connection 14 between the point 12 and the point 13, each of those points is free to follow its own path of travel. As shown in Fig. 1, upon the point 13 of the drive member having reached 13' along the circumference G, the point 12 will have attained 12' along the epicycloid F, the connection 14 having enabled the point 12 having reached the point 12' to deviate more or less from the circumference G without opposing any resistance thereto. Such relative deviations in the paths of travel will merely result in corresponding oscillations for the connection 14 which being non-rigid will not exert any dangerous stresses or strains.

It will then be possible without any inconvenience to impart a very high frequency of vibration to the mass 10, as high as several hundred thousand vibrations per minute. The resulting centrifugal force which may reach as much as several hundred tons will not result in a breakdown at any point of the apparatus.

In one exemplary embodiment shown in Figures 2 to 5, the eccentric rotary mass 10 is adapted to roll along the internal surface 11 of a fixed annulus 11a arranged on a wall 15 of the frame 16 of the device and secured thereto through screws 17. The rotary mass 10 has secured thereto through screws 18 a pair of cylindrical side flanges 19 supporting the element 12 through which rotation is imparted to the mass 10. The flanges 19 are of a diameter substantially greater than that of the mass 10 so that the driving element 12 is spaced from the contact circumference of the mass 10 with the recess surface 11.

The frame 16 is closed at its sides with flanges 20 carrying bearings 21. The bearings 21 receive therein a shaft 22 driven from pulleys 23. It will be noted that the shaft 22 extends through the rotary mass 10 but without contacting it, extending through a suitable aperture 24 formed in said mass.

The shaft 22 has secured thereon a pair of carefully balanced arms 25 through which the flanges 19 and thereby the mass 10 is adapted to be driven.

For that purpose each of the arms 25 carries at one of its ends a projecting cylindrical finger 13 secured thereto with a nut 26. The cylindrical finger 13 engages a recess 27 in the flange 19 with an average amount of circumference clearance or play sufficient to allow for the desired freedom in the connection.

In the flanges 19 there are further formed circular apertures 28 in which there is a wear-taking member 12 press-fitted therein and secured through a key means 38, said wear-taking member forming the drive point for said flange. A rectangular recess 29 is furthermore formed in said flange. Within the part 12 rigid with the flange 19, and also in the part 13 rigid with the arm 25 suitable impressions or recesses 30 and 31 are formed adapted to receive therein the respective ends of a pusher member 14 which provides for a free connection between the arms 25 and the flange 19. The pusher 14 is disposed within the rectangular recess 29 with an appropriate amount of clearance. The pusher 14 is held in place by means of side plates or strips 32 suitably secured to the flange 19 as with screws. On the arm 25 at the end thereof opposite to that supporting the finger 13 a suitable balance member 33 is provided which extends into an appropriate recess 34 in the flange 19.

The flanges 19 are laterally guided by means of projections 35 mounted on the wall 15 on the frame or alternatively on the arms 25. The frame 15 is adapted to be secured to an apparatus in conjunction with which the device of the invention is to be used, through a pair of bolts extending through suitable holes. The device may be cooled as through a circulation of compressed or aspirated air.

Figure 6:
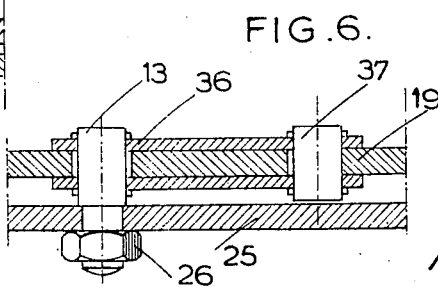
Figure 6 is a cross-sectional view similar to Fig. 5 but relating to a modification.
Figure 4:
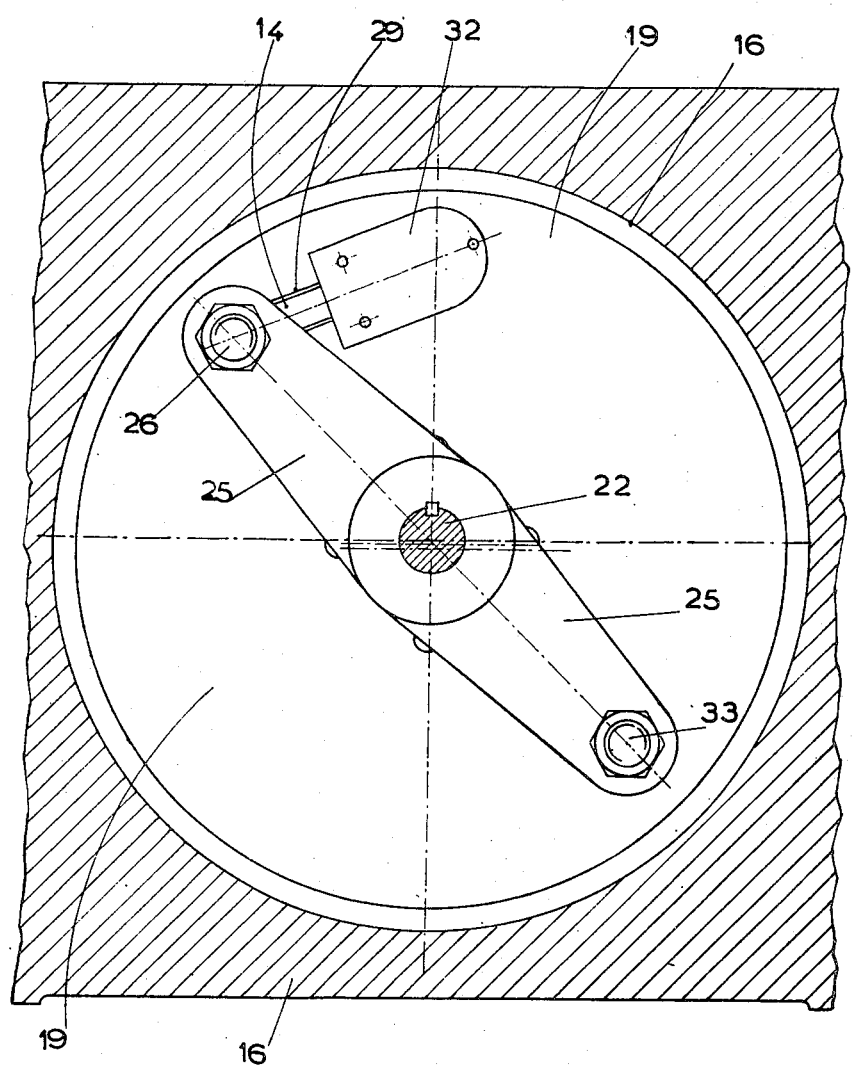
Figure 4 is a side elevational view of the rotary portions of the vibrator as seen from the line IV—IV of Fig. 2.

As the shaft 22 is rotated under the action of the pulley 23 the arms 25 are driven thereby. Said arms through the medium of the fingers 13, pushers 14 and the part 12 cause rotation of the flanges 19 and consequently the rotary mass or body 10. The latter under the action of centrifugal force developed therein will soon be applied against the side walls of the cylindrical recess 11 and will then roll therealong, each individual point of said body following an epicycloidal path of travel of the character shown in Fig. 1, thereby generating virbrations of a frequency which will be proportionately high as the difference between the diameters of 10 and 11 is smaller. In this movement the connecting points 12 for the flanges 19 describe sinuous curves such as F wherein the undulations are proportionately smoother or less sharp as the points 12 are spaced farther away from the contact points 10 and 11. It will be at those points 12 that the drive force tending to rotate the fingers 13 rigid with the arms 25 will be applied through the medium of the pushers 14. Said points 13 follow a fixed circumference (G as shown in Fig. 1). The relative deviations between the paths of travel of 12 and 13 are compensated for by the oscillations of the pusher 14 which is freely movable within its housing 29. The drive thus is accomplished through a yielding of flexible connection. Rather than using a pusher such as 14 serving to drive the flanges 19 through a thrust exerted on the part 12 of said flange, the connection from the arms 25 to the flanges 19 may be accomplished (as shown in Fig. 6) through the use of pull-rods or links 36, there being as shown two links 36 pivoted to the finger 13 rigid with the arms 25. The opposite ends of said links are pivoted on a pin 37 rigid with the flanges 19 thus replacing the wear-member 12 of the embodiment shown in Fig. 2.

Figure 2:
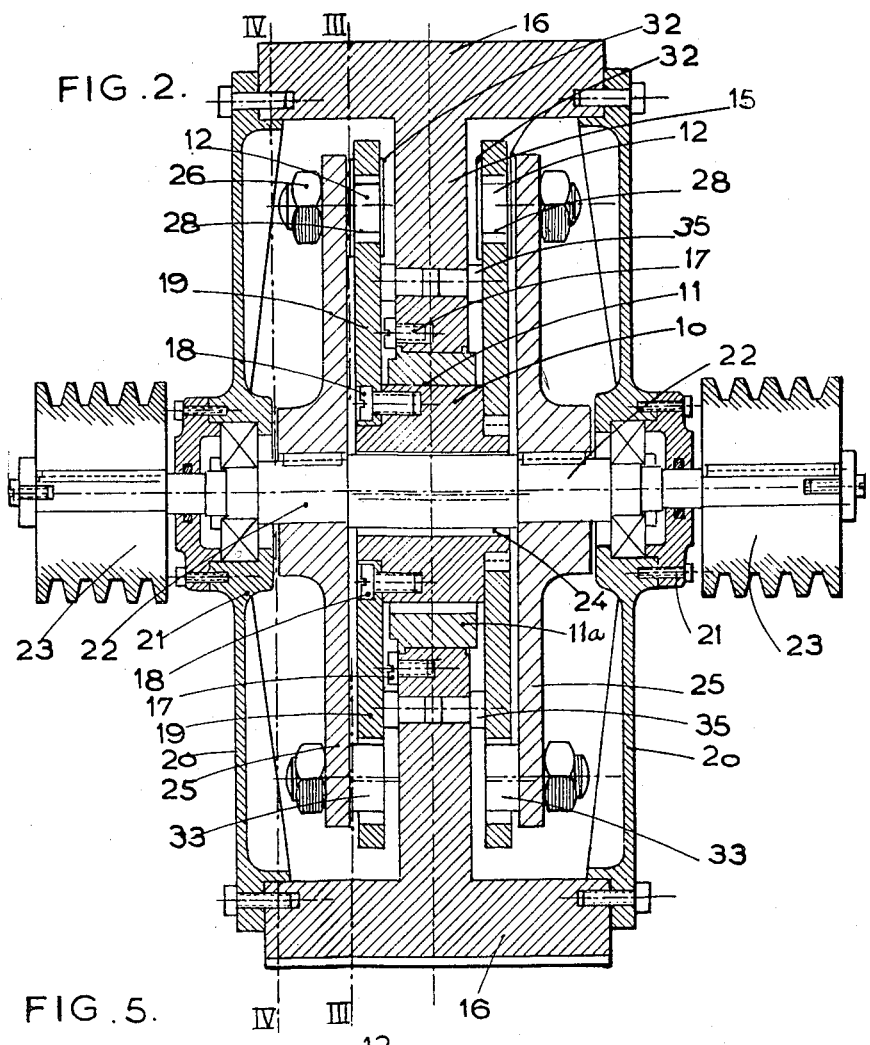
Figure 2 is a transverse cross-section of a vibrator embodying said drive.
Figure 5:
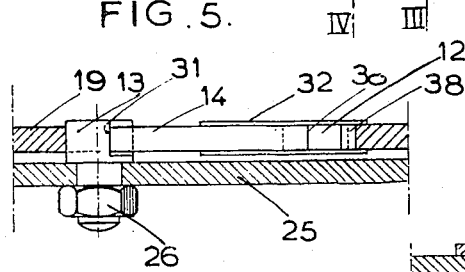
Figure 5 is a partial cross-section on the line V—V of Fig. 3.

Rather than using rigid elements 14 or 36 as shown the connection from the arms 25 to the flanges 19 may be obtained through any suitable resilient or flexible yielding means providing the requisite freedom of motion to compensate for the relative deviations in the trajectories of the points of the drive member, i. e. arm 25, and those of the rotary body 10 (Fig. 2).

It will of course be understood that the specific preferred embodiment described and shown in detail hereinabove is in no way restrictive in character and has been given merely by way of example. Various modifications and improvements may be applied thereto within the scope of the ensuing claims.

I claim:

1. A vibrator comprising a frame having a cylindrical opening, a cylindrical rotating mass positioned in said opening for rolling movement on the inner surface of said opening with its axis parallel to the axis of the opening, a drive shaft, and non-rigid connecting means positioned outside of the periphery of said opening in the frame for imparting rotary motion of the drive shaft to said mass.

2. A vibrator comprising a frame having a cylindrical opening, a cylindrical rotating mass positioned in said opening for rolling movement on the inner surface of said opening with its axis parallel to the axis of the opening, a drive shaft passing through the center of said opening and eccentrically through an opening in the center of said mass, lateral flanges carried by said mass, arms carried by said shaft, and means positioned exteriorly of the periphery of said opening in the frame interconnecting the flanges and arms.

3. A vibrator comprising a frame having a cylindrical opening, a cylindrical rotating mass positioned in said opening for rolling movement on the inner surface of said opening with its axis parallel to the axis of the opening, a drive shaft passing through the center of said opening and eccentrically through an opening in the center of said mass, lateral flanges carried by said mass, arms carried by said shaft, said flanges having elongated non-radial recesses provided therein outside the periphery of said opening in the frame, pusher elements freely mounted in said recesses, an abutment in each recess engaged by one end of the pushers, and fingers carried by said arms engaging the other end of said pushers for transmitting rotation from the shaft to the mass.

4. A vibrator comprising a frame having a cylindrical opening, a cylindrical rotating mass positioned in said opening for rolling movement on the inner surface of said opening with its axis parallel to the axis of the opening, a drive shaft passing through the center of said opening and eccentrically through an opening in the center of said mass, lateral flanges carried by said mass, arms carried by said shaft, and links positioned outside of the periphery of said frame opening for inter-connecting the ends of the arms with the outer portions of said flanges.

5. In a vibrator, a frame having a cylindrical opening, a rotating mass adapted to roll on the inner surface of said cylindrical opening with its axis parallel to the axis of said opening, lateral flanges carried by said mass for driving the same, a driving shaft mounted on said frame and having an arm, and non-rigid means connecting said arm to the lateral flanges of the rotating mass.

6. In a vibrator, a frame having a cylindrical opening therein, a rotating mass adapted to roll on the inner surface of said cylindrical opening with its axis of rotation parallel to the axis of said opening, lateral flanges carried by said mass for driving the same, a drive shaft mounted on said frame, arms carried by said shaft, and freely movable pusher elements connecting the ends of said arms with said flanges for transmitting rotary movement from the arms to the flanges.

7. In a vibrator, a frame having a cylindrical opening, a rotating mass adapted to roll on the inner cylindrical surface of said opening with its axis of rotation parallel to the axis of the opening, lateral flanges carried by said mass for effecting its rotation, a drive shaft mounted in the frame, arms carried by the drive shaft, and links interconnecting the ends of the arms with said flanges for transmitting rotary movement of the shaft to said rotating element.

PIERRE CHARLES REBUT.

REFERENCES CITED

The following references are of record in the file of this patent:

UNITED STATES PATENTS

| Number | Name | Date |
| --- | --- | --- |
| 1,733,373 | Jubien et al. | Oct. 29, 1929 |
| 2,422,639 | Wenander | June 17, 1947 |

FOREIGN PATENTS

| Number | Country | Date |
| --- | --- | --- |
| 541,057 | Great Britain | Nov. 11, 1941 |